United States Patent
Schulz et al.

(10) Patent No.: US 8,022,632 B2
(45) Date of Patent: Sep. 20, 2011

(54) COLOR-CONTROLLED ILLUMINATION DEVICE

(75) Inventors: Volkmar Schulz, Stolberg (DE); Eduard Johannes Meijer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 431 days.

(21) Appl. No.: 12/160,947

(22) PCT Filed: Jan. 10, 2007

(86) PCT No.: PCT/IB2007/050069
§ 371 (c)(1),
(2), (4) Date: Jul. 15, 2008

(87) PCT Pub. No.: WO2007/083250
PCT Pub. Date: Jul. 26, 2007

(65) Prior Publication Data
US 2010/0158061 A1    Jun. 24, 2010

(30) Foreign Application Priority Data
Jan. 19, 2006    (EP) ..................................... 06100577

(51) Int. Cl.
H05B 37/02    (2006.01)
(52) U.S. Cl. .......................... 315/149; 315/291; 315/307
(58) Field of Classification Search .......... 315/149–159, 315/291, 307–308; 250/205, 216, 226; 372/38.02
See application file for complete search history.

(56) References Cited

U.S. PATENT DOCUMENTS

| | | | |
|---|---|---|---|
| 6,088,142 A | 7/2000 | Cao et al. | |
| 6,411,046 B1 * | 6/2002 | Muthu | 315/309 |
| 6,495,964 B1 * | 12/2002 | Muthu et al. | 315/149 |
| 6,507,159 B2 * | 1/2003 | Muthu | 315/307 |
| 6,630,801 B2 * | 10/2003 | Schuurmans | 315/307 |
| 7,012,382 B2 * | 3/2006 | Cheang et al. | 315/291 |
| 7,319,298 B2 * | 1/2008 | Jungwirth et al. | 315/307 |
| 2003/0111533 A1 | 6/2003 | Chang | |
| 2003/0169359 A1 * | 9/2003 | Merrill et al. | 348/308 |
| 2005/0062446 A1 | 3/2005 | Ashdown | |
| 2005/0072908 A1 * | 4/2005 | Grunert et al. | 250/226 |
| 2005/0122065 A1 | 6/2005 | Young | |
| 2005/0133879 A1 * | 6/2005 | Yamaguti et al. | 257/435 |
| 2005/0219380 A1 * | 10/2005 | Wu | 348/223.1 |
| 2006/0192125 A1 * | 8/2006 | Yoganandan et al. | 250/354.1 |

FOREIGN PATENT DOCUMENTS

JP    2005129877 A1    5/2005

OTHER PUBLICATIONS

J. Rancourt; "Optical Thin Films, User Handbook", 1996, SPIE. Optical Engineering Press, XP002435296, pp. 82-83.

* cited by examiner

*Primary Examiner* — Douglas W Owens
*Assistant Examiner* — Tung X Le

(57) ABSTRACT

The invention relates to a color-controlled illumination device (1) with a number of light emitters, for example LEDs (L1, L2, L3, L4), of different primary colors. Photosensors (D1, D2, D3) consisting of a photodiode (20) covered with different dielectric filter layers (21) measure the light output of the light emitters (L1, L2, L3, L4) with distinct oscillating sensitivity curves that extend over the whole relevant spectral range. In a control unit (14), the actual color point of the illumination device (1) is calculated and the emissions of the light emitters (L1, L2, L3, L4) are individually adapted in order to match a target color point $((X,Y,Z)_{target})$ given with e.g. CIE tri-stimulus values.

10 Claims, 2 Drawing Sheets

COLOR-CONTROLLED ILLUMINATION DEVICE

This application is a national stage application under 35 U.S.C. §371 of International Application No. PCT/IB2007/050069 filed on Jan. 10, 2007 and published in the English language on Jul. 26, 2007 as International Publication No. WO2007/083250, which claims priority to European Application No. 06100577.3, filed on Jan. 19, 2006, all of which are hereby incorporated herein by reference.

The invention relates to an illumination device comprising a light emitter and a photosensor. Moreover, it relates to a photosensor that is suited for such an illumination device and a method for monitoring such an illumination device.

In order to design an illumination device (lamp) that is able to produce a wide range of colors, Light Emitting Diodes (LEDs) with different colors may be used. These LEDs define a sub area in the color space indicating the color gamut that can be realized via all possible linear combinations. In high-power LEDs, the dissipated power will however lead to a temperature increase of the active area close to 185° C. With increasing temperature, the intensity of the LEDs decreases and the spectral peak position shifts in a noticeable and undesirable way for the human eye. Thus, determining the actual color point emitted by the lamp requires up to date spectral information of the LED primary colors, during operation of the lamp.

From the US 2003/111533 A1, an illumination device is known wherein red, green and blue LEDs are individually controlled in a feedback loop based on their light output. The measurement of the light output is achieved with photosensitive elements disposed behind different color filters that let only light of a certain limited spectral band pass. If the spectrum emitted by an LED lies outside such a spectral band, the corresponding sensor contributes effectively nothing to the measurement.

Based on this situation it was an object of the present invention to provide means for a simple and reliable monitoring and control of the color of an illumination device.

This objective is achieved by an illumination device according to claim 1. Preferred embodiments are disclosed in the dependent claims.

According to its first aspect the invention relates to an illumination device comprising the following components:
a) At least one light emitter. The light emitter may be a single lamp or a combination of several, identical or distinct lamps. Moreover, it is understood that the light output of the whole illumination device is the superposition of the light output of all its light emitters if there are more than one.
b) At least one photosensor for measuring the light output of the aforementioned light emitter, wherein the sensitivity curve of this photosensor extends in an oscillating (quasi-periodic) way over the whole spectral range covered by the light emitter(s). The "light output" of a light emitter is typically defined by its spectrum, i.e. as the wavelength-dependent emitted light intensity per unit wavelength (unit: $W/m^3$). During a measurement, this spectrum is convoluted with the spectral sensitivity curve of the measuring device.
c) A processing unit that is coupled to the aforementioned photosensor for receiving measured signals from the photosensor (which indicate the measured light output) and that is adapted to determine at least one characteristic value of the light output of the light emitter(s). The characteristic value may for example comprise the color point or the Color Rendering Index of the light emitter(s).

The described illumination device makes use of a photosensor with a sensitivity curve that extends over the whole spectral range of the light emitter(s). For every emission spectrum that can be generated by the light emitter(s), the photosensor will therefore contribute to the measurement of the light output of the illumination device. This guarantees that a maximal amount of information is available for the characterization of the actual light output.

According to a further development of the invention, the illumination device comprises at least two light emitters with different emission spectra. This allows to generate different color points by varying the relative intensity of the light emitters. The actual number of light emitters with different emission spectra may be arbitrarily large in the illumination device. Preferably, the illumination device comprises three (or more) light emitters with different emission spectra (e.g. with maxima at red, green and blue). In this case three primary colors are available that can cover a large sub space of the whole color space.

If at least two light emitters are present, the processing unit may particularly be adapted to drive them individually in a closed loop such that their common light output optimally matches a given characteristic value of the light output, particularly a given color point. In this respect, an "optimal match" means that the light output of the illumination device (i) exactly meets a predetermined characteristic value, or (ii) approaches said characteristic value as close as possible (e.g. approaches a given color point in a predetermined color space with a predetermined metric of color-distances as close as it is possible with the used light emitters). Suitable designs of the processing unit for achieving a feedback control of light emission of the illumination device can readily be designed by persons skilled in the art. Examples of suited controllers may further be found in literature (cf. for example US 2005/122065 A1, US 2003/111533 A1, US 2005/062446 A1).

In another embodiment of the invention, the illumination device preferably comprises at least two photosensors with distinct spectral sensitivity curves for measuring the light output of the light emitter(s), wherein each of said sensitivity curves extends in an oscillating way over the whole spectral range covered by the light emitter(s). The distinct oscillating (quasi periodic) sensitivity curves of the photosensor response guarantee that the measurements of the individual photosensors are independent and sufficiently distinct from each other to be able to discriminate different spectra.

The higher the number of photosensors with different spectral sensitivity curves, the better the spectral resolution that can be achieved with their common measurements. Preferably the illumination device comprises three photosensors with different sensitivity curves, because this number provides a good compromise between accuracy and costs. Of course higher numbers of photosensors can be used, too.

While the light emitters may in principle be any kind of lamp (or group of lamps), it is preferred that they comprise LEDs, phosphor converted LEDs, LASERs, phosphor converted LASERs, colored fluorescent lamps, filtered (colored) halogen lamps and/or filtered (colored) Ultra High Performance (UHP) lamps.

The photosensor of the illumination device may particularly be realized as a photodiode covered with a dielectric layer. This embodiment will be described separately in more detail below.

If the photosensors comprise a photodiode, it is preferred that this photodiode is integrated into a substrate on which the light emitters are mounted. The substrate may for example be silicon (Si).

In principle, any geometrical arrangement of light emitters and photosensors is possible. In a preferred embodiment, the photosensors are disposed in a distributed way between the light emitters. If the light emitters are for example LEDs that are disposed in a matrix arrangement in a plane, one photosensor can be disposed between each two neighboring light emitters.

In a preferred embodiment, the processing unit includes a storage (e.g. RAM, ROM, EPROM, hard disk or the like) which comprises calibrated relations between at least one characteristic value of each light emitter at various operating conditions and the corresponding measured signals of the photosensors. If desired, the processing unit can then readily determine the actual color point of a particular light emitter if said light emitter is turned on while all other light emitters are turned off.

According to its second aspect, the invention relates to a photosensor that is characterized by a sensitivity curve which extends in an oscillating way over a given spectral range, e.g. the range of visible light or a wavelength range from at least 500 nm to 700 nm. Such a photosensor can inter alia be used with advantage in an illumination device of the kind described above.

A discrimination of spectra may particularly be achieved with a photosensor of the aforementioned kind if the sensitivity curve oscillates (in the relevant spectral range) between each two neighboring local maxima by an amount of at least 10%, preferably of at least 20% of the smaller of said two local maxima. With other words should the minima of the sensitivity curve be less than 90%, preferably less than 80% of the smallest neighboring local maximum.

In a preferred embodiment, the photosensor comprises a photodiode that is covered with a dielectric layer. By choosing the dielectric constant and/or the specific thickness of that dielectric layer appropriately, different quasi-periodic filtering behaviors can be achieved such that the combination of dielectric layer and photodiode displays a desired oscillating sensitivity curve.

The aforementioned dielectric layer preferably comprises silicon dioxide ($SiO_2$) and/or titanium dioxide ($TiO_2$). Also silicon nitride ($Si_3N_4$) is a possibility.

The thickness of the dielectric layer is preferably in the range of 50 nm to 2.5 μm, most preferably the range of 100 nm to 800 nm. The dielectric layer may be of uniform thickness over the whole photodiode. Alternatively, the thickness of the dielectric layer may vary, e.g. if the layer has the form of a wedge. The dielectric material should be transparent to the light that is to be detected.

The invention further relates to a method for monitoring an illumination device with at least one light emitter, for example an LED. According to the method the light output of the light emitter is measured with a sensitivity curve that extends in an oscillating way over the whole spectral range of the light emitter.

In a further development of the method, at least two light emitters are measured in the described way, and the light emitters are then individually controlled based on the measured light output such that their common light emission optimally matches a given characteristic value, particularly a given color point.

The methods comprise in general form the steps that can be executed with an illumination device of the kind described above. Therefore, reference is made to the preceding description for more information on the details, advantages and improvements of that method.

These and other aspects of the invention will be apparent from and elucidated with reference to the embodiment(s) described hereinafter. These embodiments will be described by way of example with the help of the accompanying drawings in which:

FIG. 1 shows a schematic sketch of an illumination device according to the present invention;

FIG. 2 schematically shows a photodiode with a single layered dielectric filter integrated into a Si substrate;

Like reference numbers in the Figures refer to identical or similar components.

Figure 1:
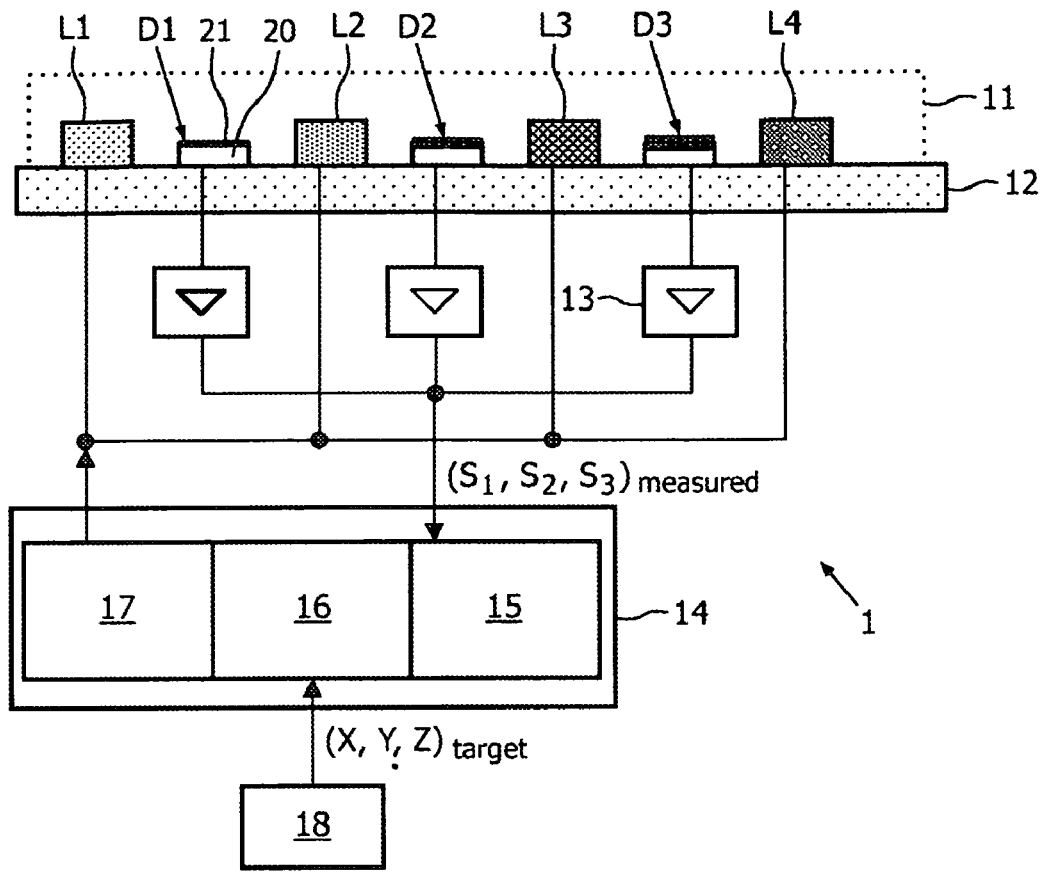

FIG. 1 schematically shows one embodiment of an illumination device 1 according to the present invention. The device comprises four LEDs (or strings of LEDs) L1, L2, L3, and L4 with different colors—e.g. green, red, blue and amber—disposed on a substrate 12 and integrated into an optic 11. Between the four LEDs, three photosensors D1, D2, and D3 are disposed for measuring the light output of the LEDs L1-L4. The photosensors D1, D2, and D3 are realized by photodiodes 20 covered with dielectric filter layers 21. In general, the illumination device could consist of k sensors and n light emitters of primary colors, i.e. the Figure shows the particular case of k=3 and n=4.

Figure 3:
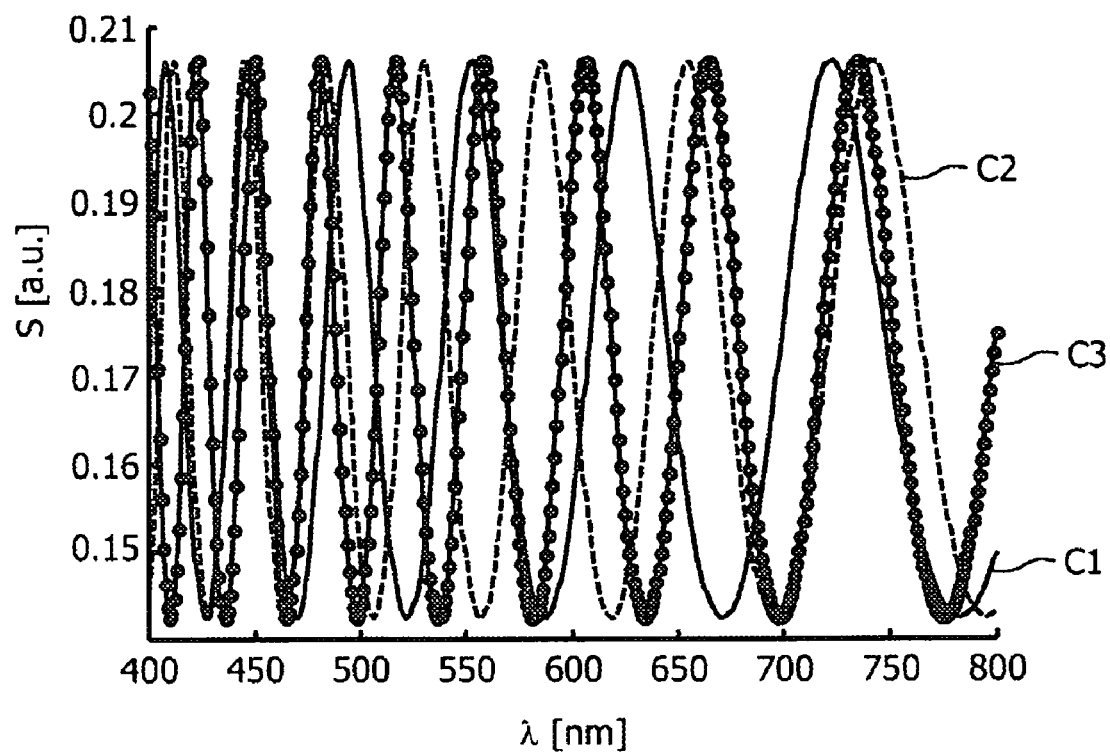
FIG. 3 shows three exemplary filter response curves of photodiodes with single layered dielectric filters of different thickness.

FIG. 3 shows the spectral filter response S (i.e. the signal passing the filters under monochromatic illumination of wavelength λ with given intensity) in arbitrary units for the three dielectric filter layers 21 of the photosensors D1, D2, and D3. It can be seen that the response curves C1, C2, and C3 oscillate quasi-periodically and extend across the whole relevant spectral range, i.e. from wavelengths λ less than 400 to more than 800 nm. The shown response curves C1, C2, C3 correspond particularly to single-layered dielectric filter photodiodes having single layers of $SiO_2$ with a thickness from 1 μm to 2.5 μm. It should be noted that the spectral sensitivity of the whole photosensors D1, D2, and D3 is determined by the shown filter response curves C1, C2, C3 of their filter layers 21 multiplied by the spectral sensitivity of the associated photodiode 20.

Figure 2:
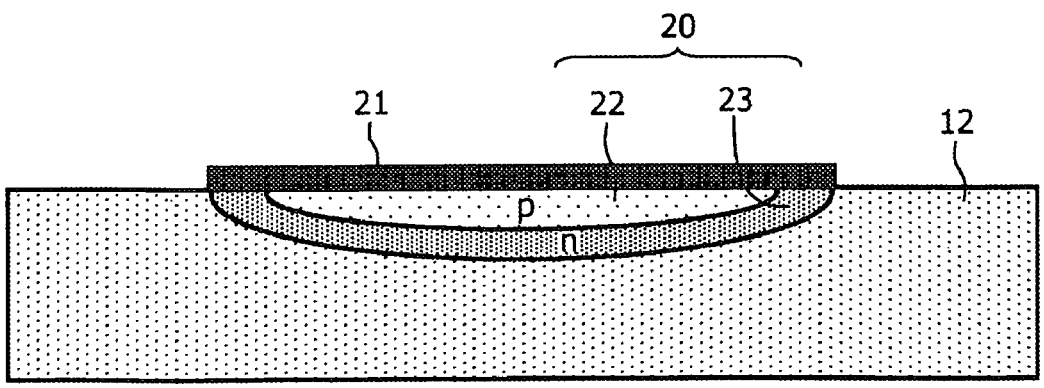

FIG. 1 shows the photosensors D1, D2, D3 schematically on the surface of the substrate 12. Because of their low complexity, such sensors with single-layered dielectric filters (SDF) can easily be integrated into the substrate 12. This is shown in more detail in FIG. 2. The submount or substrate 12 may for example consist of Si. A n-doped zone 23 and a p-doped zone 22 constitute a photodiode 20, which is covered by a single dielectric layer 21 that may for instance consist of $SiO_2$. By choosing the dielectric material (and thus the dielectric constant) and its thickness appropriately, the spectral sensitivity curve of the whole photosensor can be adapted as desired.

FIG. 1 further shows that the signals of the photosensors D1, D2, and D3 are amplified by amplifiers 13 and then sent to a "color point calculation unit" 15 which is part of a control unit 14. The control unit 14 further comprises a "color control unit" 16 and LED drivers 17. The color control unit 16 compares the color point determined by the color point calculation unit 15 from the measured signals $(S_1, S_2, S_3)_{measured}$ with a target color point $(X, Y, Z)_{target}$ provided by an external input 18, wherein the color point may for example be expressed by CIE tri-stimulus values. Based on the result of this comparison, the color control unit 16 sends adjusted drive signals to the LED drivers 17, which are coupled to the LEDs L1, L2, L3 and L4 and which adjust the average light of the LEDs by adjusting the average amplitude of the currents (DC, PWM etc.) to them.

With the described illumination device 1, the time division multiplex (TDM) technique can be used in order to characterize the spectrum of any of the primary colors, i.e. of the LEDs L1, L2, L3 and L4. According to this technique, the measurement of the different color points of the four primary colors is performed sequentially by switching only one color on and the others off. If for example only the green LED L1 is switched on, the following three different signals (e.g. photocurrents) from the photosensors D1, D2, and D3 are measured:

$$S_{11} = g_1 \cdot \int_{\lambda_{1,low}}^{\lambda_{1,upper}} F_1(\lambda) \cdot p_S(\lambda) \cdot p_{L1}(\lambda) \cdot d\lambda$$

$$S_{12} = g_2 \cdot \int_{\lambda_{1,low}}^{\lambda_{1,upper}} F_2(\lambda) \cdot p_S(\lambda) \cdot p_{L1}(\lambda) \cdot d\lambda$$

$$S_{13} = g_3 \cdot \int_{\lambda_{1,low}}^{\lambda_{1,upper}} F_3(\lambda) \cdot p_S(\lambda) \cdot p_{L1}(\lambda) \cdot d\lambda$$

In these formulas, the factors $F_1$, $F_2$, and $F_3$ correspond to the actual filter functions of the sensors units D1, D2, and D3, respectively. The factors $g_1$, $g_2$, and $g_3$ are constants, and the factors $p_S(\lambda)$ correspond to the spectral sensitivity of the photodiode, which is assumed to be identical for the three photosensors D1, D2, and D3. It should be noted that the $F_i$ (i=1; 2; 3) correspond to the spectral filter response curves C1, C2, and C3 of the photosensors (cf. FIG. 3). Finally, the factor $p_{L1}$ is the emission spectrum of the active LED L1.

The signals $S_{11}$ to $S_{13}$ are different from each other because different optical filters $F_1$, $F_2$, $F_3$ are used. Thus, the signals will change differently when the peak-wave-length, the peak height, or the pulse-width are changing in the emitted light.

Figure 4:
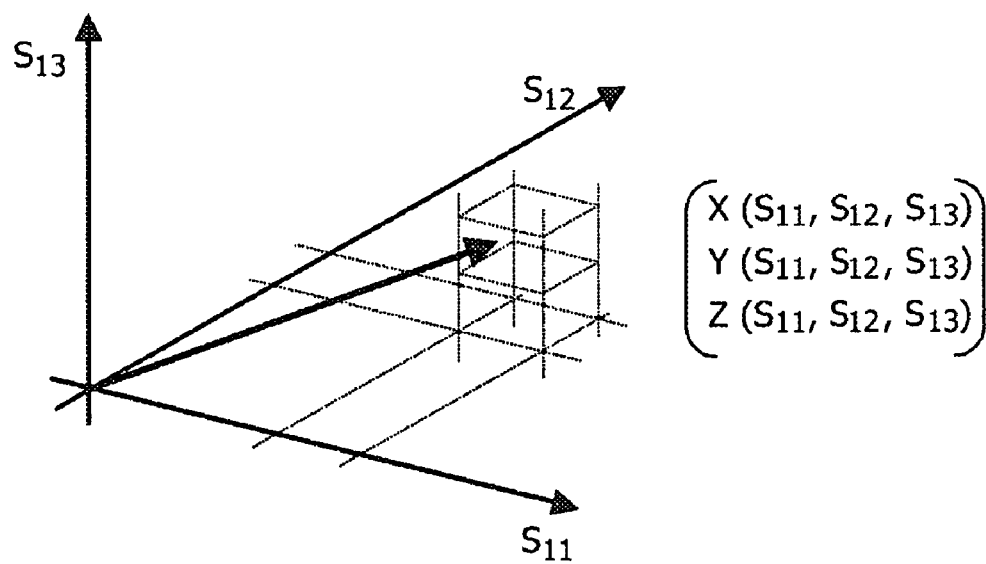
FIG. 4 illustrates the mapping of a vector of measurements to the corresponding point in color space.

In a calibration procedure, spectral data of the LEDs under consideration can be measured (by separate spectrometers) and used to associate the color point of that LED with the obtained sensor signals $S_{11}$ to $S_{13}$. FIG. 4 shows the resulting mapping of a vector ($S_{11}$, $S_{12}$, $S_{13}$) of sensor signals to the associated tri-stimulus values (X, Y, Z) that were determined independently. This mapping can be calculated by a 3D table acquired by the calibration and stored in the controller 14.

To keep the stored data as few as possible, one can think of a 3D color space that is divided into cubes, where each cube represents a certain color point (X,Y,Z). An algorithm can then be used to figure out the triple ($S^*_{11}$, $S^*_{12}$, $S^*_{13}$) which (i) describes the center of such a cube and (ii) fits best to the actual sensor values ($S_{11}$, $S_{12}$, $S_{13}$), e.g. by minimum quadratic distance (FIG. 4).

The principles of the present invention can be applied to multi-primary colored lamps, preferably based on LEDs or phosphor-converted LEDs. Some of the problems overcome by the invention are:

The change in color point that occurs due to change of temperature, change of current, aging of the LEDs, of phosphor or the driver electronic, is measured and corrected for, resulting in a stabilized color point.

No requirement for pulse-width modulated (PWM) driving.

The amount of sensors is not determined by the amount of primary colors, but by the desired measurement accuracy. Therefore, the amount of sensors can be less than the amount of LEDs in the lamp.

Avoiding the redesign of the matched filters (typically for small-band matched filter systems), that is required if the bin or the type of LED has changed.

Advantages achieved by the invention comprise:

easy characterization of the LEDs;

sensors with low complexity using single layer dielectric filters;

sensors can easily be integrated into a silicon submount;

in Time Division Multiplexed (TDM) color characterization (n−1 primaries are switched off), only k=3 filtered sensors will determine peak position, height and half-width of each of the n>3 primary colors of a device;

Scalable: using more than k>3 filtered sensors will lead to higher spectral resolution per LED;

filtered sensors are independent of the used primary color, due to quasi-periodic filter characteristics;

compensation of environmental light is possible, if all LEDs are switches off.

The invention therefore provides a very simple solution for highly precise color point stabilization in LED based light sources. Spectral information of each primary color is achieved by using sensors with single-layered dielectric filters (SDF). The filters have a quasi-periodic broadband response as a function of wavelength and can thus be used for sensing of the different primary colors. Possible applications of the invention are inter alia:

active color feedback control to enable high quality and long-term stable light generation using light devices having more than one primary color;

light system as an external feedback for high quality and long-term stable light generation.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. An illumination device (1), comprising: a) at least one light emitter (L1, L2, L3, L4); b) at least two photosensors (D1, D2, D3) for measuring the light output of the light emitter (L1, L2, L3, L4) over at least a portion of the spectral range thereof, wherein the sensitivity curves of the photosensors are distinct and oscillatingly extend over the spectral range of the light emitter (L1, L2, L3, L4); c) a processing unit (14) coupled to the photosensors (D1, D2, D3) for receiving measuring signals therefrom and determining a characteristic value of the light output of the light emitter (L1, L2, L3, L4) based, at least in part, on the measuring signals; wherein the sensitivity curve oscillates between each two neighboring local maxima by an amount of at least 10% of the smaller of said two local maxima.

2. The illumination device (1) of claim 1, comprising at least two light emitters (L1, L2, L3, L4) with different emission spectra.

3. The illumination device (1) of claim 2, wherein the processing unit (14) is adapted to drive each of the light emitters (L1, L2, L3, L4) in a closed control loop such that a combined light output thereof substantially matches a given characteristic value of the light output.

4. The illumination device (1) of claim 1, wherein the light emitter (L1, L2, L3, L4) is chosen of the group consisting of: LEDs, phosphor converted LEDs, LASERs, phosphor converted LASERs, colored fluorescent lamps, filtered (colored) halogen lamps, and filtered (colored) UHP lamps.

5. The illumination device (1) of claim 1, wherein the light emitter (L1, L2, L3, L4) is mounted on a substrate (12) and wherein at least one of the photosensors (D1, D2, D3) comprises a photodiode (20) integrated into the substrate (12).

6. The illumination device (1) of claim 1, wherein the processing unit (14) includes a storage medium for storing calibrated relations between at least one characteristic value of the light output of the light emitter (L1, L2, L3, L4) and the corresponding signals (S11, S12, S13) of the photosensors (D1, D2, D3).

7. The illumination device (1) of claim 1, wherein the characteristic value comprises at least one color point (X, Y, Z) or a Color Rendering Index of the light emitter (L1, L2, L3, L4).

8. The illumination device (1) of claim 1, wherein at least one of the photosensors (D1, D2, D3) comprises a photodiode (20) covered with a dielectric layer (21).

9. The illumination device (1) of claim 8, wherein the dielectric layer (21) comprises silicon dioxide $SiO_2$ and/or titan dioxide $TiO_2$.

10. The illumination device (1) of claim 8, wherein the dielectric layer (21) has a thickness ranging from 50 nm to 2.5 nm.

* * * * *